US008119560B2

(12) United States Patent
Caldwell et al.

(10) Patent No.: US 8,119,560 B2
(45) Date of Patent: Feb. 21, 2012

(54) ALDEHYDE REDUCING COATING

(75) Inventors: Kenneth G. Caldwell, Mountville, PA (US); Gourish Sirdeshpande, Lancaster, PA (US); William Barrows, Elizabethtown, PA (US); John R. Garrick, Lancaster, PA (US); Michael Cook, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 12/460,486

(22) Filed: Jul. 20, 2009

(65) Prior Publication Data

US 2010/0016151 A1      Jan. 21, 2010

Related U.S. Application Data

(60) Provisional application No. 61/135,309, filed on Jul. 18, 2008.

(51) Int. Cl.
*B01J 20/22* (2006.01)
*D21H 17/07* (2006.01)
*B05D 1/12* (2006.01)
*B05D 3/00* (2006.01)
*B29B 15/10* (2006.01)
*B27K 3/36* (2006.01)
*B27K 3/50* (2006.01)
*B27K 3/52* (2006.01)

(52) U.S. Cl. ............... 502/401; 106/287.2; 106/287.23; 106/287.24; 106/287.25; 106/287.26; 427/180; 427/189; 427/194; 427/195; 427/201; 427/202; 427/203; 427/204; 427/256; 427/287; 427/288; 427/421.1; 427/427.6; 427/427.7; 427/428.01; 427/429; 427/445; 428/540; 428/541

(58) Field of Classification Search ................. 502/401; 106/207.2, 207.23, 207.24, 207.25, 207.26, 106/287.2, 287.23, 287.24, 287.25, 287.26; 427/180, 189, 194, 195, 201, 202, 203, 204, 427/256, 287, 288, 421.1, 427.6, 427.7, 428.01, 427/429, 433.1, 445; 428/540, 541
See application file for complete search history.

(56) References Cited

U.S. PATENT DOCUMENTS 4,443,354 A * 4/1984 Eian ............................. 252/190
6,375,775 B2 * 4/2002 Philbin et al. ................. 156/205
2007/0287018 A1 * 12/2007 Tutin et al. ................... 428/505

* cited by examiner

*Primary Examiner* — Stuart Hendrickson
*Assistant Examiner* — Daniel Berns

(57) ABSTRACT

The invention is a surface coating which will reduce the aldehyde concentration in a room via a aldehyde reactive material contained in the coating. Upon reaction, the aldehyde becomes part of the reactive molecule and, thus, is permanently held within the coating.

18 Claims, No Drawings

ALDEHYDE REDUCING COATING

CROSS REFERENCE TO RELATED APPLICATION

This application claims the benefit under 35 U.S.C. §119 (e) of U.S. provisional application Ser. No. 61/135,309, filed Jul. 18, 2008.

FIELD OF THE INVENTION

The present invention involves a thin film coating which, when applied indoors, is able to reduce the amount of aldehyde (including formaldehyde) by virtue of an aldehyde reactive substance contained therein.

BACKGROUND OF THE INVENTION

Formaldehyde is representative of aldehydes in the following description. Formaldehyde is a colorless, pungent-smelling gas, which can cause watery eyes, burning sensations in the eyes and throat, and difficulty in breathing when exposed to elevated levels, i.e. levels above 0.1 parts per million (ppm). Chronic exposure at lower concentration can also cause similar symptoms. High concentrations may trigger attacks in people with asthma. Some people can develop sensitivity to formaldehyde resulting in skin rashes, hives, etc. The International Agency on Cancer Research has classified formaldehyde as a known carcinogen.

Particularly indoors, the general population may be exposed to formaldehyde through its use in construction materials, wood products, textiles, home or office furnishing, paper, cosmetics, cigarette smoke, pharmaceuticals and indoor cleaning products. Formaldehyde levels are particularly high in new construction due to high emissions from new construction materials and interior furnishing. Thus, there is a need and desire to reduce or eliminate formaldehyde concentrations, particularly in closed spaces, such as offices, schools, factories, homes and healthcare facilities. It is further desired that a formaldehyde reducing substance, after reacting with formaldehyde, have little to no detrimental effect on the coating itself. For example, some existing formaldehyde reactive materials cause the coating to yellow initially or after exposure to the environmental substances such as NOx.

It is also worth noting that the requirements for including the formaldehyde reactive material in the coating are more stringent than when the formaldehyde reactive material is contained within the structure of the material as many of these detrimental effects can be masked deep within the structure of the material. Masking the detrimental effects is much more difficult when the reactive material is on or near the surface. The disclosed formaldehyde reducing surface coating also requires that the crystals of the formaldehyde reactive compound be fine, i.e. small in size, and well dispersed throughout the coating in order to obtain optimal formaldehyde reducing performance.

SUMMARY OF THE INVENTION

The invention is an aldehyde reducing surface coating, which will reduce the amount of aldehyde via an aldehyde reactive substance contained in the coating. The aldehyde, upon reaction, becomes part of the aldehyde reactive molecule and is permanently held within the coating. The aldehyde reactive substance has a fine crystal size in the range from about 5 nm to about 50 nm.

DETAILED DESCRIPTION OF THE INVENTION

The formaldehyde reducing coating of the invention includes a formaldehyde reactive substance. The preferred formaldehyde reactive substance for this invention is succinimide, which is a cyclic secondary amine. The amount of formaldehyde reactive substance in the coating can be from 0.5-25% and preferably 5.0% by weight of the dry coating. The preferred coating of the invention is waterborne, but solvent coatings can also be used as long as the solute can solubilize the formaldehyde reacting substance. The preferred amount of coating is approximately 20 dry g/ft2, which provides approximately 1 g/ft2 succinimide to the surface. Environmental Chamber testing shows that this level will reduce the formaldehyde concentration in a room by an average of 50% up to 3 months.

The coating also contains a solute, fine filler particles (<325 mesh) and a binder polymer. The preferred filler to binder ratio is 15:1, however, the range is from about 1:1 to about 50:1. The preferred filler is calcium carbonate, but can include and is not limited to: clay, dolomite, silica, talc, gypsum, wollastonite, calcite, aluminum trihydrate, mica, barium sulfate, zinc oxide, zinc sulfate, sand, perlite, diatomaceous earth, organic fillers, and mixtures thereof. The preferred binder is ethylene vinyl chloride, but can include and is not limited to: epoxies, urethanes, polyesters, natural and modified natural polymers (such as protein or starch), and polymers that contain any of the following monomers: vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, and any ester.

The coatings often, but not always, contain small amounts of processing additives including surfactants, defoamers, dispersing agents, thickeners, and biocides. The preferred solids content of the coating is 50%, but can range from 5-90%. The preferred dry film thickness is 1.5 mils, but can range from 0.5-10 mils. The preferred method of application is spraying, however, the coating can applied by any other method including roller, brush, roll coating, curtain coating, and knife coating.

The formaldehyde reactive substance dissolves in the solute, and when the coating is dried it crystallizes on the surface of the fine filler, which provides for optimum dispersion and formation of the fine crystals. The smaller the crystal size, the better utilization of the formaldehyde reactive substance because the formaldehyde reaction begins on the surface of the crystal where the reaction rate is highest. For optimum formaldehyde reducing performance, the crystal size of the formaldehyde reactive substance is in the range from about 5 to about 50 nm. As the reaction moves further into the crystal the reaction rate is reduced due to the formaldehyde having to move through an ever increasing diffusion layer of reacted material. Finally it's likely that the rate slows to such a level as to leave an unreacted core.

Moreover, larger crystals of the formaldehyde reactive substance provide much less formaldehyde reduction. By way of example, if succinimide is sprayed directly on glass and is forced to dry, much larger crystals will form, namely in the range of 100-1000 nm, than when the coating of this invention with succinimide is applied to mineral fiber ceiling tiles. As will be shown in greater detail below, Environmental Chamber testing of the succinimide on glass showed poor initial formaldehyde reduction (<5%), with such reduction quickly disappearing in a few days. In contrast, when using succinimide in the coating of the invention, the succinimide showed high formaldehyde reduction (50% average) for an extended period of time. It should be noted that the amount of formaldehyde reactive substance must be enough to provide the required longevity of formaldehyde reducing performance. At the same time, there must be enough filler particles to provide sufficient surface area for fully spreading the formaldehyde reducing substance though out the coating.

The coating of the invention can be applied in the manufacturing of a building product board substrate or post applied to already constructed room surfaces. One anticipated application of the formaldehyde reducing coating of the invention is as the finish coating for mineral fiber acoustical ceiling tile. The reactivity of formaldehyde reducing substance is maximized since it is near the surface where it can react with the formaldehyde in the room. For mineral fiber acoustical ceiling tiles, it is particularly important that the coating have no detrimental effect on performance or visual.

EXAMPLES

Example #1

In this example the coating of this invention using succinimide is used to finish coat a mineral fiber ceiling tile: ULTIMA Acoustical Ceiling Tile (Armstrong World Industries, Inc.).

| Ingredient | Trade Name | Purpose | Company | % of Wet Volume | % of Dry Volume |
|---|---|---|---|---|---|
| Water | | Solute | | 13.95 | |
| Sodium Polyacrylate | Nopcote 63900-40% | Dispersant | Nalco | 0.36 | 0.22 |
| Calcium Carbonate Slurry | Camel-Fine 75% Slurry | Fine Filler | Imerys | 53.15 | 58.63 |
| Ethylene Vinylchloride Latex | Airflex 4530-50% | Binder | Air Products | 9.03 | 6.65 |
| Dolomitic Limestone | DF-5025 Dolomite | Coarse Filler | Specialty Minerals | 20.81 | 30.63 |
| Silicone Defoamer | Foamaster 1309 | Defoamer | Henkel Corp | 0.03 | 0.04 |
| Hydroxyethyl Cellulose | Natrosol FPS HB | Thickener | Aqualon | 0.17 | 0.25 |
| Succinimide | | Formaldehyde Reactive Substance | Tiancheng International | 2.5 | 3.58 |

% Solids = 74.17

Filler/Binder Ratio = 15.36

Viscosity = 1200 cps @ 10 rpm (Brookfield RVP)

Wet Application = 40 g/ft2 (grams/square foot of ceiling tile)

Dry Application = 29.67 g/ft2

Calculated Succinimide Application = 1 g/ft2

Substrate = ULTIMA Acoustical Ceiling Tile (Armstrong World Industries Inc).

Example #2

Same as example #1 but coating application is cut in half and therefore ½ the succinimide is applied:

Wet Application=20 g/ft2

Dry Application=14.83 g/ft2

Calculated Succinimide Application=½ g/ft2

Substrate=ULTIMA Acoustical Ceiling Tile (Armstrong World Industries Inc).

Example #3

In this example the coating of this invention with succinimide is used to finish coat a mineral fiber ceiling tile: CIRRUS Acoustical Ceiling Tile (Armstrong World Industries, Inc.).

| Ingredient | Trade Name | Purpose | Company | % of Wet Volume | % of Dry Volume |
|---|---|---|---|---|---|
| Water | | Solute | | 32.32 | |
| Sodium Polyacrylate | Nopcote 63900-40% | Dispersant | Nalco | 0.08 | 0.06 |
| Ethyl Hydroxyethyl Cellulose | Bermocoll E 481 FQ | Thickener | Bero Kemi AB | 0.26 | 0.52 |
| Silicone Defoamer | Foamaster 1309 | Defoamer | Henkel Corp | 0.23 | 0.46 |
| Calcium Carbonate Slurry | Camel-Fine 75% Slurry | Fine Filler | Imerys | 54.78 | 81.71 |
| Ethylene Vinylchloride Latex | Airflex 4530-50% | Binder | Air Products | 7.33 | 7.30 |
| Succinimide | | Formaldehyde Reactive Substance | Tiancheng International | 5.0 | 9.95 |

% Solids = 50.28

Filler/Binder Ratio = 12.35

Viscosity = 400 cps @ 10 rpm (Brookfield RVP)

Wet Application = 20 g/ft2 (grams/square foot of ceiling tile)

Dry Application = 10.06 g/ft2

Calculated Succinimide Application = 1 g/ft2

Substrate = CIRRUS Acoustical Ceiling Tile (Armstrong World Industries Inc).

Example #4

Same as example #3 but coating application is cut in half and therefore ½ the succinimide is applied:
Wet Application=10 g/ft2
Dry Application=5.03 g/ft2
Calculated Succinimide Application=½ g/ft2
Substrate=CIRRUS Acoustical Ceiling Tile (Armstrong World Industries Inc).

Performance Testing

Formaldehyde Reduction Testing was done in a 65 L Stainless Steel Environmental Testing Chamber at two different continuous formaldehyde input concentrations of 1.75 ppm and 0.10 ppm. The samples size was 10"×11" and the air exchange rate is once per hour. Samples were run up 8 weeks and the output formaldehyde concentration was sampled with standard 2,4-dinitrphenylhydrazine (DNPH) cartridges. The DNPH cartridge is washed with acetonitrile, diluted to a 5 ml volume, and the 2,4-dinitrophenylhydrazone derivative of formaldehyde is analyzed by liquid chromatography.
Table 1 shows % formaldehyde reduction.

TABLE 1

| Sample | HCHO Input | % Initial Reduction | 1 Week | 2 Weeks | 3 Weeks | 4 Weeks | 5 Weeks | 6 Weeks | 7 Weeks | 8 Weeks |
|---|---|---|---|---|---|---|---|---|---|---|
| Example #1 | 1.75 | 80.24 | 74.25 | 63.47 | 44.31 | 32.93 | 20.36 | 12.87 | 12.57 | 4.19 |
| Example #1 | 0.10 | 73.08 | 69.23 | 62.82 | 55.13 | 52.56 | 48.72 | | | |
| Example #2 | 1.75 | 75.21 | 70.02 | 60.17 | | | | | | |
| Example #2 | 0.10 | 69.41 | 65.22 | 58.79 | | | | | | |
| Example #3 | 1.75 | 88.76 | 75.28 | 53.37 | | | | | | |
| Example #3 | 0.10 | 80.41 | 78.35 | 78.35 | | | | | | |
| Example #4 | 1.75 | 80.51 | 70.41 | 49.98 | | | | | | |
| Example #4 | 0.10 | 76.58 | 74.23 | 72.87 | | | | | | |
| Ultima Control | 1.75 | 68.52 | 28.22 | 9.82 | 0.05 | | | | | |
| Cirrus Control | 1.75 | 58.44 | 25.32 | 8.05 | 0.02 | | | | | |
| Succinimide on Glass | 1.75 | 4.94 | 0.15 | | | | | | | |

Table 2 shows % desorption of formaldehyde adsorbed.

TABLE 2

| Sample | % Initial Desorption | 24 hour | 48 hour | 96 hour | % Total Desorption |
|---|---|---|---|---|---|
| Example #1 | 7.89 | 0.01 | | | 7.90 |
| Ultima Control | 29.63 | 25.31 | 20.07 | 10.51 | 85.52 |
| Cirrus Control | 31.82 | 25.32 | 21.16 | 8.64 | 86.94 |

As shown in the Examples 1-4, using succinimide as the formaldehyde reactive substance provides substantial formaldehyde reduction (50% average), and has significant longevity of reaction. The diminishing of formaldehyde reduction over time happens because as the reaction moves further into the succinimide crystal the reaction rate is reduced due to the formaldehyde having to move through an ever increasing diffusion layer of reacted material. However, the overall average formaldehyde reduction for the measured longevity is an average of about 50%. Having the highest formaldehyde reduction early is particularly advantageous in new construction or refurbishing since many of the building materials and furnishings have their highest formaldehyde emission levels when they are new.

The ULTIMA and CIRRUS panel controls show early physisorption of formaldehyde which diminishes quickly and will desorb, as shown by TABLE 2, when clean air is put into the chamber. In contrast, samples with the coating of the invention using succinimide as the formaldehyde reactive substance showed virtually no desorption. It therefore follows that the formaldehyde is chemically and permanently combined with the succinimide to form the stable N-methanol succinimide via chemisorption.

The samples were also tested for various performance parameters including a Burnt Gas test where the coating was tested for yellowing upon exposure to various environmental agents such as NOx. More specifically, the Burnt Gas test is used to measure the colorfastness (or yellowing) of materials when exposed to oxides of nitrogen from burnt gas fumes (simulated warehouse yellowing). The 2½"×3" samples are mounted on a rotating drum and exposed to the products of combustion of a Bunsen burner. The temperature of the chamber is controlled at 140 degrees F and the elapse time can be 1, 2, 3, or 4 weeks. Original color readings are made and readings after each week's exposure. The color difference is reported in Delta E, L, a, and b. For example, adipic dihydrazide in the surface coating of the invention showed significant yellowing in the Burnt Gas test with a delta b* of about +5-7. Whereas, the succinimide did not yellow significantly in the Burnt Gas test showing a delta b* of about +2-3, where delta b*<4 meets the requirement of the test.

Another particularly useful test was finger scratch testing which would reveal any significant softening of the coating due to excessive water adsorption caused by a highly hygroscopic formaldehyde reactive substance. The Finger Scratch test comprises metal tongues (know in the art as fingers) evenly arranged in a row and securely held at the same level. The tongues are made of steel and are approximately 1.875 inches long and have a thickness which increases going from left to right. The thicknesses are: 10, 12, 16, 18, 20, 22, and 25 mils each. The board to be tested is placed in a holder below the tongues and the tongues are allowed to overlap across the top edge of the board a distance of approximately 7/32 inches. The tongues are then drawn down across the board at a speed of about 20 inches per minute. The thicker tongues more easily scratch the board. Thus, the scratch rating given on the test board is the thinnest tongue which left a scratch on the board after the tongues were drawn across it. A number of formaldehyde reactive substances showed reduced scratch resistance in the Finger Scratch test, which indicated coating softening due to water adsorption. A mineral fiber ceiling tile with the coating of this invention containing a hygroscopic formaldehyde reactive substance such as sodium sulfamate had a relatively low finger scratch result rating of 14-16, while the same with succinimide (non hygroscopic) had a rating of 22-25.

Other amines such as adipic dihydrazide, sodium sulfamate, sodium N-methyltaurine, metanillic acid sodium salt, sulfanilic acid sodium salt, diethanolamine, glutamic acid sodium salt, ethanolamine, 2-amino-1-butanol, 4-aminobenzoic acid sodium salt also show formaldehyde reduction capability. However, these amines each have at least some difficulty with water adsorption and/or yellowing. More specifically, these formaldehyde reducing substances can be very hygroscopic and adsorb water into the dried coating film, which weakens and softens the coating film, thereby reducing its durability characteristics such as abrasion resistance. In addition, these amines produce coating films which are too yellow for the lighter finish coating colors. Still other amines, while white enough originally, yellowed significantly upon exposure to environmental agents such as NOx.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aldehyde reducing surface coating comprising: a binder, the binder being ethylene vinyl chloride; and an aldehyde reactive material contained in the coating which will reduce the aldehyde concentration indoors by chemisorption, wherein the coating does not yellow.

2. The coating of claim 1, wherein the aldehyde reactive material is succinimide.

3. The coating of claim 1, the binder, further including epoxies, urethanes, polyesters, natural and modified natural polymers (such as protein or starch), and polymers that contain any of the following monomers: vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, and any ester.

4. The coating of claim 1, including a filler, wherein the filler can be any of the following: calcium carbonate, clay, dolomite, silica, talc, gypsum, wollastonite, calcite, aluminum trihydrate, mica, barium sulfate, zinc oxide, zinc sulfate, sand, perlite, diatomaceous earth, organic fillers, vermiculite, and mixtures thereof.

5. The coating of claim 4, wherein the filler to binder ratio is in the range from about 1:1 to about 50:1.

6. The coating of claim 4, wherein the filler to binder ratio is about 15:1.

7. The coating of claim 1, wherein the coating can be applied to the surface of an interior building material including gypsum board, mineral fiber board, fiberglass board, wood or wood composite, plastic, plaster, metal or textile.

8. The coating of claim 1, wherein the coating is applied at a thickness in the range from about 0.5 mils to about 10 mils.

9. The coating of claim 8, wherein the coating is applied at a thickness of about 1.5 mils.

10. The coating of claim 1, wherein the coating can be applied at an application rate of about 3 wet g/ft$^2$ to about 133 wet g/ft$^2$.

11. The coating of claim 10, wherein the coating is applied at an application rate of about 20 wet g/ft$^2$.

12. An aldehyde reducing surface coating comprising: a binder, the binder being ethylene vinyl chloride; and an aldehyde reactive material which will reduce the aldehyde concentration in a room to which it is applied, wherein the aldehyde reactive material is well dispersed and has a fine crystal size of about 5 nm to about 50 nm.

13. The coating of claim 12, wherein the aldehyde reactive material is succinimide.

14. The coating of claim 13, the binder further including epoxies, urethanes, polyesters, natural and modified natural polymers (such as protein or starch), and polymers that contain any of the following monomers: vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, styrene, butadiene, urethane, epoxy, melamine, and any ester.

15. The coating of claim 12, including a filler, wherein the filler can be chosen from the following: calcium carbonate, clay, dolomite, silica, talc, gypsum, wollastonite, calcite, aluminum trihydrate, mica, barium sulfate, zinc oxide, zinc sulfate, sand, perlite, diatomaceous earth, organic fillers, vermiculite, and mixtures thereof.

16. The coating of claim 15, wherein the filler to binder is in the range from about 1:1 to about 50:1.

17. The coating of claim 15, wherein the filler to binder ratio is about 15:1.

18. The coating of claim 12, wherein the coating can be applied to the surface of an interior building material including gypsum board, mineral fiber board, fiberglass board, wood or wood composite, plastic, plaster, metal or textile.

* * * * *